(12) United States Patent
Kim et al.

(10) Patent No.: US 10,601,091 B2
(45) Date of Patent: Mar. 24, 2020

(54) RECHARGEABLE BATTERY MODULE

(71) Applicant: SAMSUNG SDI CO., LTD., Yongin-si, Gyeonggi-do (KR)

(72) Inventors: Hyun Kim, Yongin-si (KR); Ju-Yong Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 213 days.

(21) Appl. No.: 15/194,443

(22) Filed: Jun. 27, 2016

(65) Prior Publication Data

US 2017/0005382 A1 Jan. 5, 2017

(30) Foreign Application Priority Data

Jul. 1, 2015 (KR) ........................ 10-2015-0094147

(51) Int. Cl.
*H01M 10/6556* (2014.01)
*H01M 10/6568* (2014.01)
*H01M 10/647* (2014.01)
*H01M 10/04* (2006.01)
*H01M 10/613* (2014.01)
*H01M 10/64* (2014.01)
*H01M 10/6557* (2014.01)
*H01M 2/02* (2006.01)
*H01M 2/04* (2006.01)

(52) U.S. Cl.
CPC ... *H01M 10/6556* (2015.04); *H01M 10/0431* (2013.01); *H01M 10/613* (2015.04); *H01M 10/64* (2015.04); *H01M 10/6557* (2015.04); *H01M 10/6568* (2015.04); *H01M 2/027* (2013.01); *H01M 2/0285* (2013.01); *H01M 2/0456* (2013.01); *H01M 2002/0205* (2013.01)

(58) Field of Classification Search
CPC combination set(s) only.
See application file for complete search history.

(56) References Cited

U.S. PATENT DOCUMENTS 2,790,310 A * 4/1957 Green .................... F25B 9/04
137/861
7,597,995 B2 10/2009 Yamauchi et al.
(Continued)

FOREIGN PATENT DOCUMENTS

JP 2011-146169 A 7/2011
KR 10-2006-0037599 A 5/2006
(Continued)

OTHER PUBLICATIONS

English machine translation of Japanese Publication No. JP 2011-146169 A, dated Jul. 28, 2011, 25 pages.

*Primary Examiner* — Kaity V Chandler
(74) *Attorney, Agent, or Firm* — Lewis Roca Rothgerber Christie LLP (57) ABSTRACT

In a rechargeable battery module including a plurality of unit batteries, the unit batteries include: an electrode assembly including a first electrode, a second electrode, and a separator between the first and second electrodes; a case having a polygonal column shape for accommodating the electrode assembly; and first and second plates respectively sealing openings formed at opposite sides of the case, wherein a surface of the case of a unit battery of the unit batteries contacts a neighboring unit battery of the unit batteries.

12 Claims, 9 Drawing Sheets

(56) References Cited

U.S. PATENT DOCUMENTS

| | | | |
|---|---|---|---|
| 9,774,020 B2* | 9/2017 | Fuhr | H01M 2/1077 |
| 2006/0113965 A1 | 6/2006 | Jeon et al. | |
| 2010/0266886 A1* | 10/2010 | Joswig | H01M 2/105 |
| | | | 429/120 |
| 2013/0084495 A1 | 4/2013 | Tajima et al. | |

FOREIGN PATENT DOCUMENTS

| KR | 10-2006-0103630 A | 10/2006 |
|---|---|---|
| KR | 10-2007-0083415 A | 8/2007 |
| KR | 10-2009-0044632 A | 5/2009 |
| KR | 10-2013-0035894 A | 4/2013 |

\* cited by examiner

RECHARGEABLE BATTERY MODULE

CROSS-REFERENCE TO RELATED APPLICATION

This application claims priority to and the benefit of Korean Patent Application No. 10-2015-0094147, filed in the Korean Intellectual Property Office on Jul. 1, 2015, the entire content of which is incorporated herein by reference.

BACKGROUND

1. Field

Aspects of embodiments of the present invention relate to a rechargeable battery module.

2. Description of the Related Art

A rechargeable battery differs from a primary battery in that it may be repeatedly charged and discharged while the latter is not usually recharged. Rechargeable batteries are often utilized in various high-tech fields. For example, low-capacity rechargeable batteries are used in small portable electronic devices such as mobile phones, laptop computers, and camcorders, while large-capacity rechargeable batteries are widely used as a power source for driving a motor of a hybrid vehicle or the like, and/or as a power storage battery.

Rechargeable batteries may be manufactured to have a variety of shapes, for example, cylindrical, prismatic, and pouch shapes.

Cylindrical rechargeable batteries have a characteristic of securing relatively higher energy density than rechargeable batteries having the same volume but different shapes, but due to the cylindrical structure, when desired to configure a module by connecting respective unit batteries in series and/or in parallel, cylindrical rechargeable batteries may have relatively decreased spatial efficiency compared to rechargeable batteries with different shapes.

In addition, because a battery module generally includes a cell barrier and the like for cooling the batteries to prevent heating of each unit battery, it may be relatively more difficult to attach such cooling means to lateral sides of a unit battery having a cylindrical structure, because of the curved structure.

The above information disclosed in this Background section is only to enhance the understanding of the background of the disclosure, and therefore it may contain information that does not constitute prior art.

SUMMARY

Aspects of some embodiments of the present invention include a rechargeable battery module capable of dramatically improving cooling efficiency, because it is relatively easily configured while maintaining high energy density and improving spatial efficiency and allows for relatively easy installation of a cooling part in each of unit batteries constructing the battery module.

Aspects of the present invention are not limited to the aforementioned characteristics, and other aspects not described above will be more apparent to those skilled in the art from the following detailed description of the present invention.

According to some example embodiments of the present invention, in a rechargeable battery module including a plurality of unit batteries, the unit batteries include: an electrode assembly including a first electrode, a second electrode, and a separator between the first and second electrodes; a case having a polygonal column shape for accommodating the electrode assembly; and first and second plates respectively sealing openings formed at opposite sides of the case, wherein a surface of the case of a unit battery of the unit batteries contacts a neighboring unit battery of the unit batteries.

The unit battery may include groove portions extending parallel to a length direction of the unit battery, at edges of the surface of the case in a width direction thereof that contacts the neighboring unit battery.

The groove portion may include a cooling part extending parallel to the length direction of the unit battery.

One end of the cooling part may be connected to a cooling plate under a bottom surface of the second plate via an insulating plate in the unit battery.

The cooling part in a direction perpendicular to a length direction thereof may have at least one of circular, oval, triangular, quadrangular, and polygonal cross-sectional shapes.

The cooling part may include an inflow part and an outflow part each including multiple tubes extending in the length direction, and a rotating part at one end of the inflow and outflow parts.

The inflow part, the outflow part, and the rotating part may be configured to circulate a cooling fluid.

The cooling plate may include a multi-layered hole into which the cooling part is inserted.

The cooling plate may have a multi-layered structure including an inflow layer to which an inflow part is connected and an outflow layer to which an outflow part is connected.

The first plate may include an electrode terminal electrically coupled to the first electrode of the electrode assembly and penetrating the first plate to protrude out of the first plate.

The second plate may be electrically coupled to the second electrode of the electrode assembly.

The electrode assembly may be formed in a jelly-roll shape in which the first electrode, the second electrode, and the separator are wound.

In the rechargeable battery module according to some example embodiments of the present invention, because the case of the unit battery is formed to have the polygonal column shape, spatial efficiency is improved when arranging the unit batteries, thereby making it relatively easy to configure the rechargeable battery module having high energy density.

In addition, the rechargeable battery module according to some example embodiments of the present invention includes the groove portions, which may be inserted by the cooling parts, at the edges of the surface contacting the neighboring unit battery in the width direction thereof, thereby dramatically improving cooling efficiency of the rechargeable battery module.

DETAILED DESCRIPTION

Aspects of some example embodiments of the present invention will be described more fully hereinafter with reference to the accompanying drawings, in which example embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Further, in the drawings, size and thickness of each element may be exaggerated for ease of description, and the present invention is not necessarily limited to such sizes and thicknesses illustrated in the drawings.

In addition, unless explicitly described to the contrary, the word "comprise" and variations such as "comprises" or "comprising" will be understood to imply the inclusion of stated elements but not the exclusion of any other elements.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Figure 1:
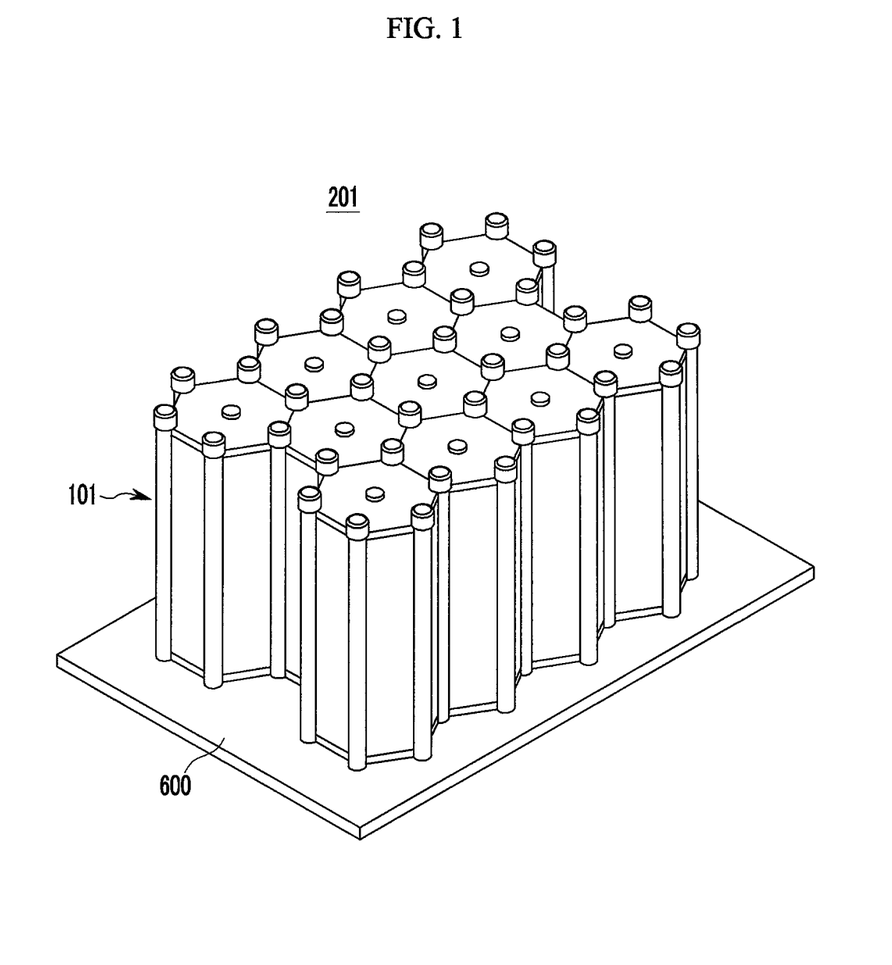
FIG. 1 illustrates a perspective view of a rechargeable battery module according to an example embodiment of the present invention.
Figure 2:
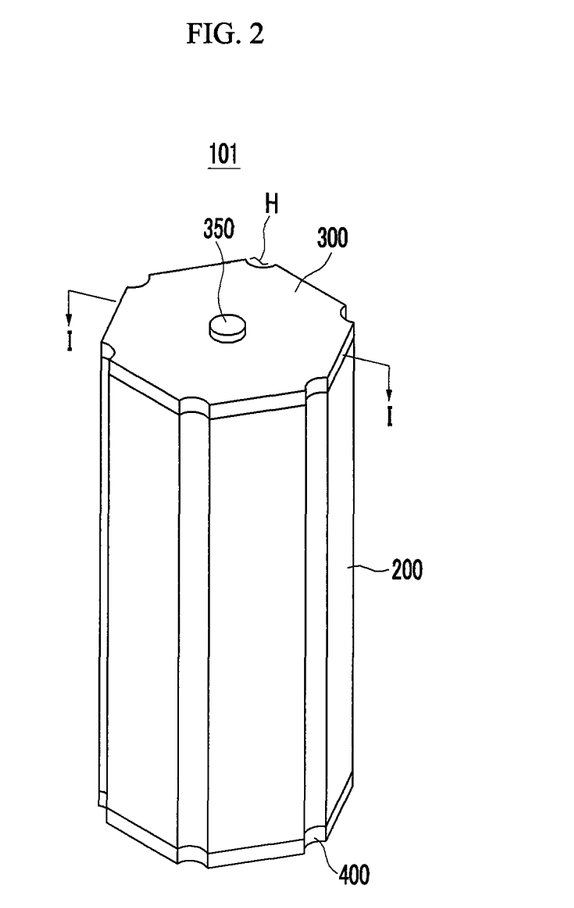
FIG. 2 illustrates a perspective view of the unit battery illustrated in FIG. 1.
Figure 3:
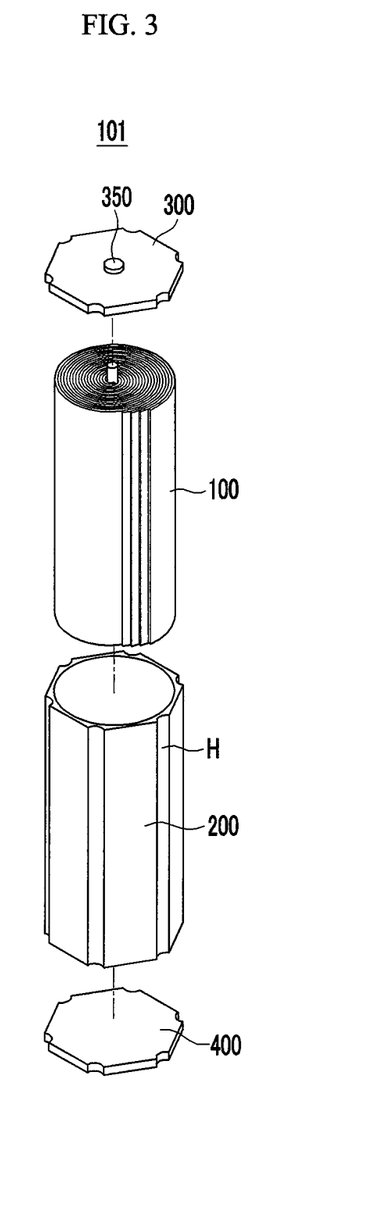
FIG. 3 illustrates an exploded perspective view of the unit battery illustrated in FIG. 2.

FIG. 1 illustrates a perspective view of a rechargeable battery module according to an example embodiment of the present invention, FIG. 2 illustrates a perspective view of the unit battery illustrated in FIG. 1, and FIG. 3 illustrates an exploded perspective view of the unit battery illustrated in FIG. 2.

Referring to FIG. 1, the rechargeable battery module 201 according to some example embodiments of the present invention includes a plurality of unit batteries 101.

The unit battery 101 includes an electrode assembly 100, a case 200, and first and second plates 300 and 400, each of which seals openings formed at opposite sides of the case 200. The electrode assembly 100 may be impregnated with an electrolyte solution.

Figure 4:
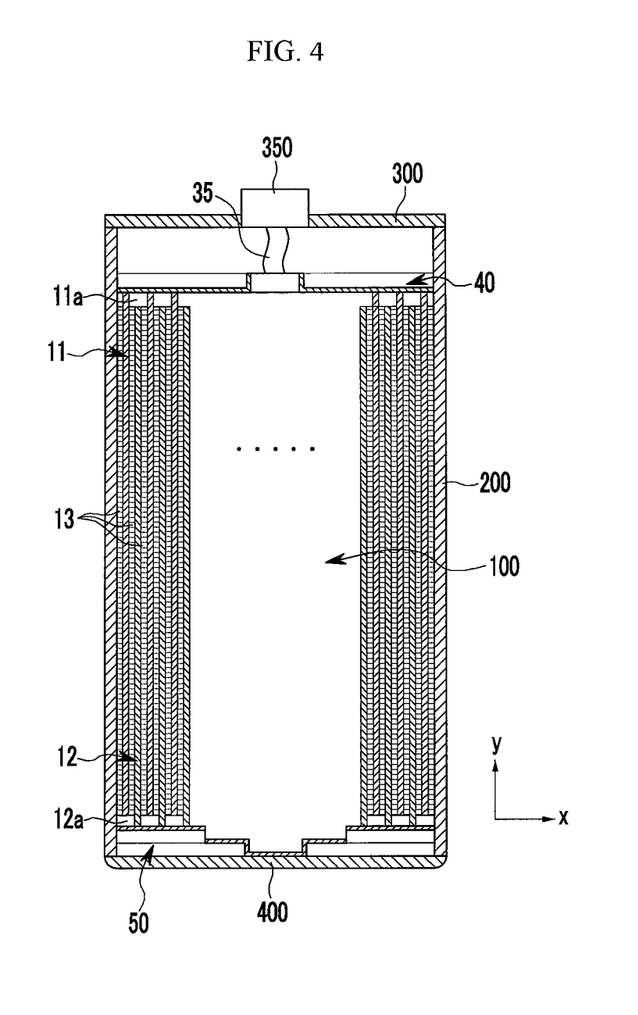
FIG. 4 illustrates a cross-sectional view of the unit battery illustrated in FIG. 2 taken along the line I-I.

Next, FIG. 4 illustrates a cross-sectional view of the unit battery illustrated in FIG. 2 taken along the line I-I.

Referring to FIG. 4, the electrode assembly 100 serves to perform charging and discharging operations, and includes a first electrode 11 and a second electrode 12 that are arranged at opposite sides of a separator 13 while interposing the separator 13 therebetween. The electrode assembly 100 may be formed by winding the first electrode 11, the second electrode 12, and the separator 13 serving as an insulator interposed therebetween in a jelly-roll arrangement.

For example, the first and second electrodes 11 and 12 interposing the separator therebetween may be wound several times so as to have a cylindrical shape. In this case, the number of windings may be chosen depending on a diameter (e.g., a maximum diameter) of the unit battery 101 and thicknesses of the separator 13, the first electrode 11, and the second electrode 12, and it is not specifically limited.

The case 200 for accommodating the electrode assembly 100 may have an external shape of a polygonal column. For example, the case 200 has a cylindrical internal space in which the electrode assembly 100 is accommodated, and may be formed in the shape of a polygonal column, opposite ends of which are formed with openings.

FIG. 3 illustrates a structure in which the electrode assembly 100 is wound in the circular jelly roll arrangement having the structure as described above and is located inside of the cylindrical case 200.

The electrode assembly 100 includes current collecting plates 40 and 50 that are respectively electrically coupled to the first electrode (e.g., a negative electrode) 11 and the second electrode (e.g., a positive electrode) 12.

For example, a current collector of the second electrode 12, for example, an uncoated region 12a where an active material is not coated on an aluminum thin film may be formed at a lower end of the second electrode 12 in a length direction (e.g., a y-axis direction) of the second electrode 12 along the length direction thereof, thereby contacting a second electrode current collecting plate 50. In addition, a current collector of the first electrode 11, for example, an uncoated region 11a where an active material of the first electrode is not coated on an edge of a copper thin film, may be arranged at an upper end of the first electrode 11 in the length direction (e.g., the y-axis direction) of the first electrode 11 along the length direction thereof so as to be electrically coupled to a first electrode current collecting plate 40.

The case 200 for accommodating the electrode assembly 100 is formed as a conductor such that it can serve as an electrode terminal. For example, the case 200 is formed of a conductive metal such as aluminum, an aluminum alloy, or nickel-plated steel, and is electrically coupled to the second electrode 12 of the electrode assembly 100, thereby serving as a positive electrode terminal.

When the case 200 serves as the second electrode 12 (e.g., the positive electrode terminal), an electrode terminal 350 included in the first plate 300 may be electrically coupled to the first electrode 11 of the electrode assembly 100 (e.g., the negative electrode 11), thereby serving as the negative terminal. On the contrary, the case 200 may serve as the negative terminal, while the electrode terminal 350 included in the first plate 300 may serve as the positive electrode terminal.

Figure 5:
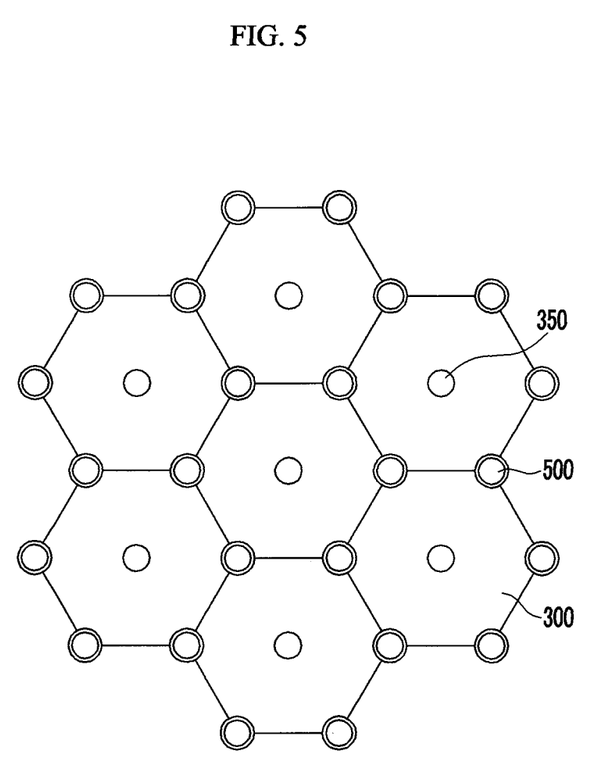
FIG. 5 illustrates a top plan view of a rechargeable battery module according to some example embodiments of the present invention.

FIG. 5 illustrates a top plan view of the rechargeable battery module 201 according to some example embodiments of the present invention.

Referring to FIG. 5, the case 200 may have a hexagonal column shape.

However, this is illustrative, and the case 200 may have any polygonal column shape including a surface for contacting the neighboring unit battery 101, but embodiments of the present invention are not specifically limited thereto. In this case, because the case 200 may be manufactured using an extrusion method, a manufacturing cost and a defect rate may be reduced compared to those manufactured by deep drawing and the like, which may improve productivity.

Next, referring to FIGS. 3 to 5, the openings formed at the opposite sides of the case 200 in the length direction thereof (e.g., the y-axis direction) may be respectively sealed by the first and second plates 300 and 400. In this case, the sealing may be performed through welding.

The first plate 300 may include the electrode terminal 350 that is electrically coupled to the first electrode 11 of the electrode assembly 100. In this case, the electrode terminal 350 may penetrate the first plate 300 to protrude out of the first plate 300. For example, the electrode terminal 350 may be, as shown in FIG. 4, connected via an electrode lead 35 that is connected to the negative electrode current collecting plate 40 electrically coupled to the first electrode 11 of the electrode assembly 100.

If necessary, the uncoated region 11a of the first electrode 11 may be directly welded to the electrode terminal 350 to electrically couple the first electrode 11 of the electrode assembly 100 to the electrode terminal 350.

The second plate 400 seals a lower part of the case 200, in the length direction thereof (e.g., the y-axis direction), and may be electrically coupled to the second electrode 12 of the electrode assembly 100. For example, as shown in FIG. 4, because the positive electrode current collecting plate 50 electrically coupled to the second electrode 12 of the electrode assembly 100 is welded to the second plate 400, the case 200 is charged identically (or substantially identically) with the second electrode 12 to act as the positive electrode terminal.

The uncoated region 12a of the second electrode 12 may be directly welded to the second plate 400 or connected thereto via a lead, so the case 200 having the lower part sealed by the second plate 400 may be charged identically (or substantially identically) with the second electrode 12.

According to some example embodiments of the present invention, as described above, because the battery case 200 is formed in the shape of a polygonal column, flat surfaces of the neighboring unit batteries 101 through which they can make surface contact with each other are secured. Accordingly, when configuring the battery module using them, it may be relatively easy to configure the battery module, because spatial efficiency may be relatively easily secured compared to alternative arrangements of modules configured using cylindrical batteries.

Additionally, even when swelling of the unit battery 101 due to overcharge or over-discharge occurs, the battery case 200 is formed in the shape of a polygonal column, thereby providing structural reinforcement and thus improving the battery's service life.

Referring back to FIGS. 2 and 3, in the rechargeable battery module 201 according to some example embodiments of the present invention, each unit battery 101 may include groove portions H that are formed at edges of the surface in a width direction thereof for contacting the neighboring unit battery 101 and in parallel with a length direction of the unit battery.

The groove portion H is concavely formed inward of the case 200 to extend in the length direction thereof. For example, the groove portion H is shaped in accordance with a shape of a cooling part 500 to be described below.

That is, cooling parts 500 are arranged close to the groove portions H that are formed at each corner of the case 200 of each unit battery 101, thereby enabling a characteristic of relatively easily securing a space where cooling means for cooling each unit battery 101 are placed.

In addition, a coolant may be introduced and discharged via the cooling part 500 in the length direction (e.g., the y-axis direction) of the unit battery 101 included in the rechargeable battery module 201, so when heat is discharged from the battery, the generated heat can effectively cooled.

Figure 6:
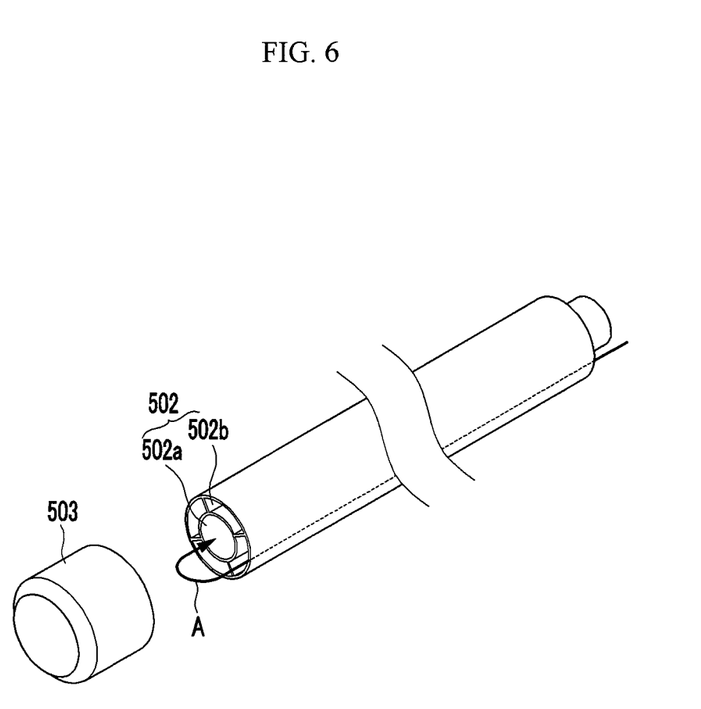
FIG. 6 exemplarily illustrates a perspective view of a cooling part included in the rechargeable battery module according to some example embodiments of the present invention.

FIG. 6 illustrates the cooling part included in the rechargeable battery module according to some example embodiments of the present invention.

Referring to FIG. 6, the cooling part 500 not only includes an inflow part 502b and an outflow part 502a included in multiple tubes 502, but also a rotating part 503 positioned at one end of the inflow and outflow parts 502b and 502a.

In the cooling part 500, the inflow and outflow parts 502b and 502a included in the multiple tubes 502 may be respectively formed in the shape of a tube that extends in the length direction. In this case, the multiple tubes 502 including the inflow and outflow parts 502b and 502a may include two or more tubes that can separately partition the inflow part 502b and the outflow part 502a. That is, if two or more tubes are provided, the cooling part 500 may include three tubes, four tubes, or more, and embodiments of the present invention are not specifically limited.

In FIG. 6, the outflow part 502a is illustrated to be formed inside of the inflow part 502b, but the inflow part 502b may be formed inside of the outflow part 502a.

As described above, when the cooling part 500 is configured to include the multiple tubes, the space through which the coolant is introduced and discharged is easily secured, and when using such multiple tubes, cooling efficiency of the rechargeable battery module 201 may be additionally improved.

Figure 7:
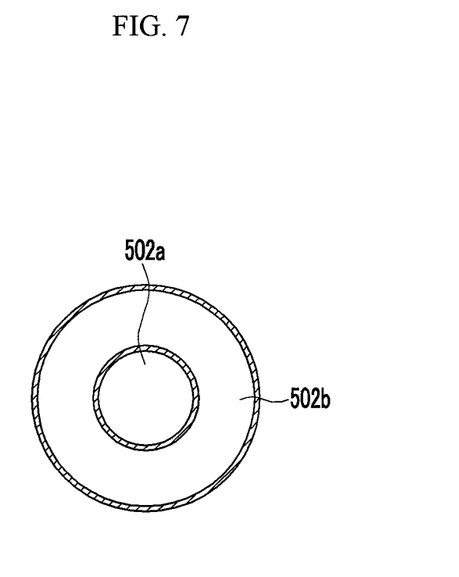
FIGS. 7 and 8 illustrate top plan views, respectively, of cooling parts included in the rechargeable battery module according to some example embodiments of the present invention.
Figure 8:
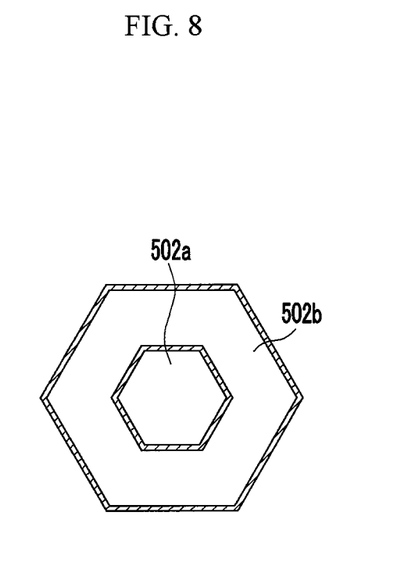

The multiple tubes 502 may have a circular cross-sectional shape as shown in FIG. 7, or may be have a polygonal cross-sectional shape as shown in FIG. 8, but embodiments of the present invention are not limited thereto. That is, when configuring the rechargeable battery module 201, the multiple tubes 502 may have oval, triangular, or quadrangular cross-sectional shapes as long as they do not deteriorate spatial efficiency. However, in terms of ease of manufacturing, the multiple tubes 502 may have a circular shape.

In this case, an operation of circulating cooling fluid is performed by the inflow part 502b, the outflow part 502a, and the rotating part 503, and in this case, the cooling fluid may be cooling water, but embodiments of the present invention are not limited thereto.

For example, the cooling fluid may be introduced from a bottom to a top of the unit battery 101 in the length direction (e.g., the y-axis direction) thereof via the inflow part 502b, may make a U-turn in an arrow direction A as indicated in FIG. 6 in the rotating part 503 positioned at an upper part of the multiple tubes 502, and may be discharged from the top to the bottom of the unit battery 101 in the length direction (e.g., the y-axis direction) thereof via the outflow part 502a.

Subsequently, a side of the cooling part 500 opposite to the side where the rotating part 503 is positioned, that is, a lower portion of the cooling part 500 is connected to a cooling plate 600.

In this case, the cooling plate 600 may be arranged under a bottom surface of the second plate 400 of each unit battery 101 via an insulating plate.

According to some embodiments of the present invention, the second plate 400 and the cooling plate 600 may be formed of a metallic material such as aluminum or an aluminum alloy. When constructing the battery module, the second plate 400 and the cooling plate 600 of each unit battery may be easily attached using a method such as welding or the like if they are formed of the same metallic material.

However, in this case, in order to prevent or reduce instances of the battery being shorted, an insulating plate for insulating between the second plate 400 and the cooling plate 600 may be provided. A shape of the insulating plate is not specifically limited as long as it can insulate therebetween.

Alternatively, when the cooling plate 600 itself is made of an insulating material, an insulating plate may not be installed.

Accordingly, a material for forming the cooling plate 600 may be a metallic material such as aluminum or an alloy thereof, or an insulating material including a polymer resin, but embodiments of the present invention are not specifically limited thereto.

In this case, the cooling part 500 is inserted into a hole 501 having a multi-layered structure formed in the cooling plate 600, so one end of the cooling part 500 to be inserted therein may be formed as shown in FIG. 6 such that the outflow part 502a protrudes further than the inflow part 502b.

Figure 9:
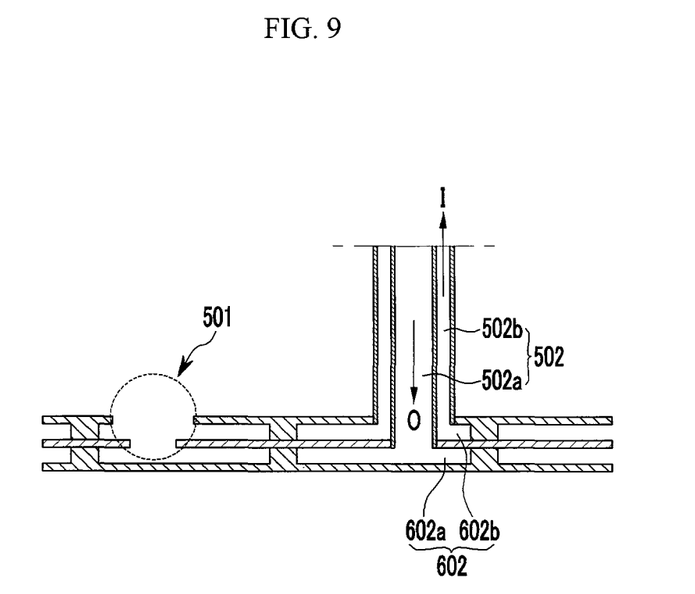
FIG. 9 illustrates a cross-sectional view of a state of the rechargeable battery module in which a cooling part is inserted into the cooling plate according to some example embodiments of the present invention.

For explanation, FIG. 9 illustrates a cross-sectional view of a state of the rechargeable battery module 201 according to some embodiments of the present invention in which one cooling part 500 is inserted into the cooling plate 600.

Referring to FIG. 9, the cooling plate 600 includes the multi-layered hole 501 that is shaped in accordance with a lower end of the cooling part 500 is in the length direction (e.g., the y-axis direction) thereof, and the cooling part 500 may be inserted into the multi-layered hole 501.

In addition, the cooling plate 600 may have a multi-layered structure including an inflow layer 602b to which the inflow part 502b of the cooling part 500 through which the coolant is introduced (I) is connected, and an outflow layer 602a to which the outflow part 502a of the cooling part 500 through which the coolant is discharged (O) is connected.

That is, the cooling plate 600 may have the multi-layered structure including layers corresponding to the number of multiple tubes 502 formed in the cooling part 500.

Accordingly, the cooling plate 600 may include three layers when the cooling part 500 includes three tubes, and the cooling plate 600 may include four layers when the cooling part 500 includes three tubes.

Alternatively, when the cooling part 500 includes two tubes and the cooling plate 600 includes two layers, the inflow layer 602b may be positioned on an upper layer of the cooling plate 600 having the multi-layered structure while the outflow layer 602a may be positioned on a lower layer of the cooling plate 600, but embodiments of the present invention are not specifically limited thereto.

According to some embodiments of the present invention, as described above, because the case of each unit battery is formed to have a polygonal column shape, spatial efficiency may be improved when configuring the module using them, so the large-capacity battery may be more easily configured. In addition, because a wider contact area between the neighboring unit batteries is secured compared to modules including conventional cylindrical rechargeable batteries, stress concentrated on each unit battery may be distributed, thereby further improving stability of the rechargeable battery module.

While this disclosure has been described in connection with what is presently considered to be practical example embodiments, it is to be understood that the disclosure is not limited to the disclosed embodiments, but, on the contrary, it is intended to cover various modifications and equivalent arrangements included within the spirit and scope of the appended claims, and their equivalents.

DESCRIPTION OF SOME OF THE SYMBOLS

11: first electrode
12: second electrode
13: separator
100: electrode assembly
101: unit battery
200: case
201: rechargeable battery module
300: first plate
400: second plate
500: cooling part
501: multi-layered hole
502: multiple tubes
502a: outflow part
502b: inflow part
503: rotating part
600: cooling plate
602a: outflow layer
602b: inflow layer

What is claimed is:

1. A rechargeable battery module comprising a plurality of unit batteries, the unit batteries comprising:
   an electrode assembly comprising a first electrode, a second electrode, and a separator between the first and second electrodes;
   a case having a polygonal column shape for accommodating the electrode assembly;
   first and second plates respectively sealing openings formed at opposite sides of the case,
   wherein a surface of the case of a unit battery of the unit batteries contacts a neighboring unit battery of the unit batteries;
   cooling parts positioned within a groove in the case of the unit battery, the groove extending parallel to a length direction of the unit battery, and the cooling parts being configured to contact neighboring unit batteries within a groove in the case of the neighboring unit batteries and to cool the unit battery, wherein the cooling parts are separated from each other; and
   a cooling plate being fluidly connected to the cooling parts at a first end of the cooling parts,
   wherein one or more of the cooling parts contact a plurality of adjacent unit batteries from among the plurality of unit batteries and each of the cooling parts comprises a first fluid conduit inside a second fluid conduit, and a rotating part at a second end of the cooling parts opposite the first end of the cooling parts where the cooling plate is connected to the cooling parts, wherein one of the first fluid conduit or the second fluid conduit is an inflow conduit and another of the first fluid conduit or the second fluid conduit is an outflow conduit, and the inflow conduit is fluidly connected to the outflow conduit through the rotating part.

2. The rechargeable battery module of claim 1, wherein the unit battery comprises groove portions extending parallel to the length direction of the unit battery, at edges of the surface of the case in a width direction thereof that contacts the neighboring unit battery.

3. The rechargeable battery module of claim 2, wherein a groove portion of the groove portions comprises a cooling part from among the cooling parts extending parallel to the length direction of the unit battery.

4. The rechargeable battery module of claim 3, wherein one end of the cooling part is connected to a cooling plate under a bottom surface of the second plate via an insulating plate in the unit battery.

5. The rechargeable battery module of claim 4, wherein the cooling plate comprises a multi-layered hole into which the cooling part is inserted.

6. The rechargeable battery module of claim 5, wherein the cooling plate has a multi-layered structure comprising an inflow layer to which the inflow conduit is connected and an outflow layer to which the outflow conduit is connected.

7. The rechargeable battery module of claim 3, wherein the cooling part in a direction perpendicular to a length direction thereof has at least one of circular, oval, triangular, quadrangular, and polygonal cross-sectional shapes.

8. The rechargeable battery module of claim 3, wherein the inflow conduit and the outflow conduit each comprise multiple tubes extending in the length direction.

9. The rechargeable battery module of claim 8, wherein the inflow conduit, the outflow conduit, and the rotating part are configured to circulate a cooling fluid.

10. The rechargeable battery module of claim 1, wherein the first plate includes an electrode terminal electrically coupled to the first electrode of the electrode assembly and penetrating the first plate to protrude out of the first plate.

11. The rechargeable battery module of claim 1, wherein the second plate is electrically coupled to the second electrode of the electrode assembly.

12. The rechargeable battery module of claim 1, wherein the electrode assembly is formed in a jelly-roll shape in which the first electrode, the second electrode, and the separator are wound.

* * * * *